(12) United States Patent
Hart et al.

(10) Patent No.: US 10,202,300 B2
(45) Date of Patent: Feb. 12, 2019

(54) STRENGTHENED GLASS ARTICLES, EDGE-STRENGTHENED LAMINATED GLASS ARTICLES, AND METHODS FOR MAKING THE SAME

(71) Applicant: CORNING INCORPORATED, Corning, NY (US)

(72) Inventors: Shandon Dee Hart, Corning, NY (US); Natesan Venkataraman, Painted Post, NY (US); Angela Jane Wilson, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/912,737

(22) PCT Filed: Aug. 21, 2014

(86) PCT No.: PCT/US2014/051992
§ 371 (c)(1),
(2) Date: Feb. 18, 2016

(87) PCT Pub. No.: WO2015/027007
PCT Pub. Date: Feb. 26, 2015

(65) Prior Publication Data
US 2016/0194235 A1   Jul. 7, 2016

Related U.S. Application Data

(60) Provisional application No. 61/869,399, filed on Aug. 23, 2013.

(51) Int. Cl.
*C03B 32/02* (2006.01)
*C03B 33/07* (2006.01)
(Continued)

(52) U.S. Cl.
CPC .............. *C03B 32/02* (2013.01); *B32B 17/00* (2013.01); *B32B 17/06* (2013.01); *C03B 17/064* (2013.01);
(Continued)

(58) Field of Classification Search
None
See application file for complete search history.

(56) References Cited

U.S. PATENT DOCUMENTS 2,779,136 A   1/1957   Hood et al.
2,998,675 A   9/1961   Olcott et al.
(Continued)

FOREIGN PATENT DOCUMENTS

CN   102503101 A   6/2012
JP   4886917 A   11/1973
(Continued)

OTHER PUBLICATIONS

Stookey, Olcott, Garfinkel, Rothermel, "Ultra-high-strength glasses by ion exchange and surface crystallization", Advances in Glass Technology, Plenum Press, New York City, 1962, pp. 397-411.
(Continued)

*Primary Examiner* — Lisa L Herring

(57) ABSTRACT

A method of manufacturing a laminated glass article is disclosed that includes forming a laminated glass article with at least one glass cladding layer and a glass core layer adhered to the glass cladding layer. The glass core layer is amenable to crystallization and optionally has a viscosity amenable to forming by a fusion lamination method. The method further includes removing a portion of the laminated glass article such that the glass core layer is exposed on at least one edge of the laminated glass article, and crystallizing at least a portion of the exposed glass core layer. A crystallized or semi-crystallized surface of the exposed glass
(Continued)

core layer has a lower CTE than a remainder of the glass core layer. A laminated glass article and a glass article having a crystalline or semi-crystalline surface portion that is integral with a bulk of the glass body are also disclosed.

16 Claims, 3 Drawing Sheets

(51) Int. Cl.
  *C03C 21/00*    (2006.01)
  *C03C 23/00*    (2006.01)
  *B32B 17/00*    (2006.01)
  *C03B 17/06*    (2006.01)
  *B32B 17/06*    (2006.01)
  *C03B 17/02*    (2006.01)

(52) U.S. Cl.
  CPC .......... *C03B 33/07* (2013.01); *C03C 21/002* (2013.01); *C03C 23/007* (2013.01); *C03C 23/0025* (2013.01); *B32B 2250/02* (2013.01); *B32B 2307/704* (2013.01); *B32B 2605/006* (2013.01); *C03B 17/02* (2013.01); *C03C 2218/345* (2013.01); *Y02P 40/57* (2015.11)

(56) References Cited

U.S. PATENT DOCUMENTS

| | | | |
|---|---|---|---|
| 3,737,294 A | 6/1973 | Dumbaugh, Jr. et al. | |
| 3,746,526 A | 7/1973 | Giffon | |
| 3,849,097 A | 11/1974 | Giffen et al. | |
| 3,907,577 A | 9/1975 | Kiefer et al. | |
| 3,931,438 A | 1/1976 | Beall et al. | |
| 3,992,179 A * | 11/1976 | Simmons ................ C03C 10/00 65/30.14 |
| 4,102,664 A | 7/1978 | Dumbaugh, Jr. | |
| 4,214,886 A | 7/1980 | Shay et al. | |
| 4,726,981 A | 2/1988 | Pierson et al. | |
| 4,814,297 A * | 3/1989 | Beall ................ C03C 10/0036 501/32 |
| 5,084,328 A | 1/1992 | Fine et al. | |
| 5,342,426 A | 8/1994 | Dumbaugh, Jr. | |
| 5,559,060 A | 9/1996 | Dumbaugh, Jr. et al. | |
| 7,201,965 B2 | 4/2007 | Gulati et al. | |
| 7,514,149 B2 | 4/2009 | Bocko et al. | |
| 8,007,913 B2 | 8/2011 | Coppola et al. | |
| 2011/0281093 A1* | 11/2011 | Gulati .................... B32B 17/06 428/213 |
| 2012/0135195 A1* | 5/2012 | Glaesemann ........ B23K 26/073 428/156 |
| 2012/0135848 A1 | 5/2012 | Beall et al. | |
| 2012/0196109 A1 | 8/2012 | Marjanovic et al. | |
| 2012/0216570 A1* | 8/2012 | Abramov .............. C03C 21/008 65/30.14 |
| 2014/0170505 A1* | 6/2014 | Tsujimura ........... H01M 10/052 429/322 |
| 2014/0290310 A1* | 10/2014 | Green ................ B23K 26/0087 65/112 |

FOREIGN PATENT DOCUMENTS

| | | |
|---|---|---|
| JP | 4972317 A | 7/1974 |
| WO | 2013016157 A1 | 1/2013 |
| WO | 2013065648 A1 | 5/2013 |
| WO | 2013129400 A1 | 9/2013 |

OTHER PUBLICATIONS

The International Search Report and the Written Opinion of the International Searching Authority, dated May 4, 2015, pp. 1-16, International Application No. PCT/US2014/051992, European Patent Office, The Netherlands.

Japanese Office Action, dated May 8, 2018, pp. 1-4, Japanese Patent Application No. 2016-536432, Japan Patent Office, Japan.

* cited by examiner

STRENGTHENED GLASS ARTICLES, EDGE-STRENGTHENED LAMINATED GLASS ARTICLES, AND METHODS FOR MAKING THE SAME

This application claims the benefit of priority under 35 U.S.C. § 371 of International Application No. PCT/US2014/051992, filed on Aug. 21, 2014, which claims the benefit of priority under 35 U.S.C. § 119 of U.S. Provisional Application Ser. No. 61/869,399, filed on Aug. 23, 2013, the content of each of which is relied upon and incorporated herein by reference in its entirety.

FIELD

The present specification generally relates to laminated glass articles and, more specifically, to laminated glass articles having strengthened edges and methods for making laminated glass articles having strengthened edges.

TECHNICAL BACKGROUND

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Accordingly, a need exists for strengthening exposed edges of laminated glass articles.

SUMMARY

In one aspect, a method of manufacturing a laminated glass article comprises forming a laminated glass article with at least one glass cladding layer and a glass core layer that is adhered to the glass cladding layer. The glass core layer is crystallizable, and optionally has a viscosity amenable to forming by a fusion lamination method. The method further comprises removing a portion of the laminated glass article such that the glass core layer is exposed on at least one edge of the laminated glass article, and crystallizing at least a surface of the exposed glass core layer. In at least one set of embodiments the crystallizability, or crystallizing, provides strengthenability, or strengthening of the laminated glass article.

In another aspect, a laminated glass article comprises a glass core layer, and at least one glass cladding layer adhered to the glass core layer, wherein the glass core layer has a higher CTE than the glass cladding layer, and at least one edge where the glass core layer is exposed. At least a portion of an exposed surface of the glass core layer is crystallized or semi-crystallized, and the crystallized or semi-crystallized glass core layer has a lower CTE than the remainder of the glass core layer.

In yet another aspect, a glass article includes a glass body, a crystalline or semi-crystalline surface portion that is integral with the glass body, and a continuous transition region (e.g., a region where the concentration of crystalline structures continuously increases in a direction toward the surface portion) forms an interface between the glass body and the surface portion. The glass body and the surface portion are free or substantially free of $TiO_2$, $ZrO_2$, and ZnO, and the surface portion has a lower average CTE than the bulk of the glass body.

In laminated glass articles, such as laminated glass sheets, the surfaces of the article may be beneficially strengthened through compressive stresses created, for example, by a mismatch in coefficient of thermal expansion (CTE) between a core layer and cladding layers of the laminated article. However, strengthening of the surfaces through compressive stress will generally create a high tensile stress in the core layer, which may be exposed when the glass article is cut. If the exposed glass core layer has a defect or is subjected to a damage event, failure or breakage of the glass article may occur. The laminated glass articles having strengthened edge surfaces, and methods for making the same disclosed herein, help to prevent such occurrences.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
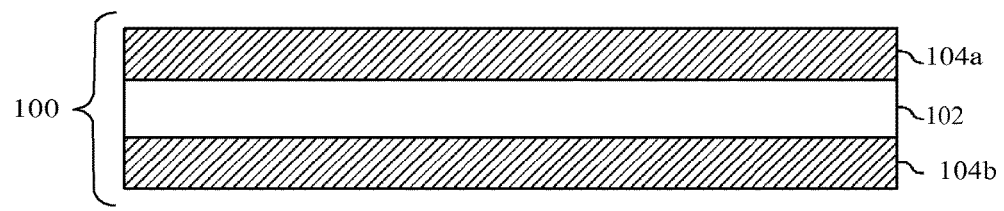
FIG. 1 schematically depicts a cross section of a laminated glass article according to one or more embodiments shown and described herein.

Reference will now be made in detail to embodiments of laminated glass articles having crystallized or semi-crystallized edge surfaces and methods for making the same. FIG. 1 schematically depicts a cross section of one embodiment of a laminated glass article. The laminated glass article generally comprises a glass core layer and at least one glass cladding layer adhered to the glass core layer. The laminated glass article comprises at least one edge where the glass core layer is exposed, for example, when the laminated glass article is cut to a size and shape that is suitable for its final use. Various embodiments of laminated glass articles and methods for making laminated glass articles will be described in more detail herein with specific reference to the appended drawings.

The term "CTE," as used herein, refers to the coefficient of thermal expansion of the glass composition averaged over a temperature range from about 20° C. to about 300° C.

The term "substantially free," when used to describe the absence of a particular component in a glass composition, means that the component is present in the glass composition, such as a contaminant, in a trace amount of less than about 1 weight %, or in some cases less than about 0.5 weight %.

In embodiments of glass compositions described herein, the concentration of constituent components (e.g., $SiO_2$, $Al_2O_3$, $LiO_2$, and the like) are given in weight percent (wt %) on an oxide basis, unless otherwise specified.

Referring now to FIG. 1, a cross section of a laminated glass article is schematically depicted. The laminated glass article 100 generally comprises a glass core layer 102 and at least one glass cladding layer. In the embodiment depicted in FIG. 1, the laminated glass article includes a pair of glass cladding layers 104a, 104b. The glass core layer 102 generally comprises a first surface and a second surface that is opposed to the first surface. The glass cladding layers 104a, 104b are adhered to the glass core layer 102 without any additional materials, such as adhesives, coating layers or the like, disposed between the glass core layer 102 and the glass cladding layers 104a, 104b. Thus, the glass cladding layers 104a, 104b are fused directly to the glass core layer 102 or are directly adjacent to the glass core layer 102. In some embodiments, the laminated glass article comprises one or more intermediate layers disposed between the glass core layer and at least one of the glass cladding layers. For example, the intermediate layers comprise intermediate glass layers and/or diffusions layers formed at the interface of the glass core layer and the glass cladding layer (e.g., by diffusion of one or more components of the glass core and glass cladding layers into the diffusion layer). In some embodiments, the laminated glass article comprises a glass-glass laminate (e.g., an in situ fused multilayer glass-glass laminate) in which the interfaces between directly adjacent glass layers are glass-glass interfaces.

The laminated glass articles 100 described herein may have improved strength as a result of dissimilar layers being laminated. For example, in some embodiments, the glass cladding layers 104a, 104b are formed from a glass composition that has a lower average coefficient of thermal expansion (CTE) than the CTE of the glass core layer 102 within the same temperature ranges. For example, when glass cladding layers formed from a glass composition having a relatively low average CTE are paired with a glass core layer formed from a glass composition having a higher average CTE during a lamination process, the difference in the CTEs of the glass core layer and the glass cladding layers results in the formation of a compressive stress in the glass cladding layers upon cooling. In some embodiments described herein, the glass cladding layers are formed from glass compositions which have average CTEs less than or equal to about $40\times10^{-7}$/° C. averaged over a range from 20° C. to 300° C. In some embodiments, the average CTE of the glass compositions may be less than or equal to about $37\times10^{-7}$/° C. averaged over a range from 20° C. to 300° C. In yet other embodiments, the average CTE of the glass compositions may be less than or equal to about $35\times10^{-7}$/° C. averaged over a range from 20° C. to 300° C.

The glass core layer 102 may be formed from a glass composition which has a high average CTE relative to the glass cladding layers 104a, 104b to improve the strength of the laminated glass article. In some embodiments, the glass core layer may be formed from glass compositions which have an average coefficient of thermal expansion (CTE) which is greater than or equal to about $40\times10^{-7}$/° C. in a range from 20° C. to 300° C. In some of these embodiments, the average CTE of the glass composition of the glass core layer may be greater than or equal to about $50\times10^{-7}$/° C. in a range from 20° C. to 300° C. In some of these embodiments, the average CTE of the glass composition of the glass core layer may be greater than or equal to about $60\times10^{-7}$/° C. in a range from 20° C. to 300° C. In some of these embodiments, the average CTE of the glass composition of the glass core layer may be greater than or equal to about $70\times10^{-7}$/° C. in a range from 20° C. to 300° C. In yet other embodiments, the average CTE of the glass composition of the glass core layer may be greater than or equal to about $80\times10^{-7}$/° C. averaged over a range from 20° C. to 300° C.

In embodiments where the CTE of the glass cladding layers is lower than the CTE of the glass core layer, at least a portion of the glass core layer may be in tension (such as where the glass core layer has a region of central tension) as a result of the mismatched or dissimilar CTE values between the glass cladding layers and the glass core layer. In embodiments where the glass core layer 102 is exposed at the edges of the glass article (for example, due to cutting of the laminated sheet), the central tension region of the glass article is exposed, which may make the glass article susceptible to breakage failure from minor flaws or damage events that occur at the exposed edge of the glass article. For example, because of an increased tensile stress in the glass core layer 102, a shock from dropping the glass article or some other form of force on the glass article, may cause the glass article to shatter. Accordingly, in embodiments described herein, the edge of glass articles where the glass core layer is exposed can be strengthened to prevent such breakage.

In some embodiments disclosed herein, an exposed glass core layer can be crystallized such as to strengthen an exposed edge of the laminated glass article 100. The crystallized or semi-crystallized surface can have a lower CTE than the bulk (e.g., the non-crystallized portion) of the glass core layer, which can lead to compressive stresses at the crystallized or semi-crystallized surface after crystallization of that portion of the laminated glass article 100. As mentioned above, forming compressive stresses in or at an edge of a layer or near an edge of a layer is a way of strengthening a portion of the glass article. Thus, by crystallizing the exposed glass core layer at the edge of the laminated glass article, the edge of the laminated glass article may be strengthened, thereby mitigating breakage of the laminated glass article.

Various methods for crystallizing the exposed surface of the glass core layer 102 may be used. According to embodiments, the glass core layer 102 may comprise a composition that crystallizes upon a heat treatment conducted after the glass composition has been melted and formed into a glass article, and even when the glass article has been cut to size, such as when the glass core layer is exposed. In some embodiments, the composition of the glass is also fusion formable, that is, amenable to forming a laminated glass article by the fusion lamination method; in these embodiments the composition of the glass core layer is crystallizable upon exposure to a heat treatment as well as fusion formable.

In some exemplary core glass compositions, $SiO_2$ is the largest constituent and, as such, $SiO_2$ is the primary constituent of the glass network formed from the glass composition. Pure $SiO_2$ has a relatively low CTE and is alkali free. However, pure $SiO_2$ has an extremely high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. In one set of embodiments, the glass composition comprises $SiO_2$ in a concentration of from about 50 wt % to about 75 wt % (or 60 to 80 mol %), and in some embodiments from about 55 wt % to about 67 wt % (or 61 to 70 mol %).

The introduction of a lithium-containing constituent such as lithia ($Li_2O$) can be utilized for crystal formation such as the $Li_2O$ being present either in the pre-melt composition (and present during melting and forming) or being introduced after melting and forming, or even after cutting or other processes. $Li_2O$ can have a strong fluxing action, and can facilitate glass melting. A controlled $Li_2O$ content can favor formation of small crystals, which can be a major factor in transparency of the product. In some embodiments, at least 5 wt % $Li_2O$ is present. In some embodiments, the content of $Li_2O$ does not exceed 7.5 wt % in the interest of maintaining fine grain size. In some embodiments, $Li_2O$ content is from about 5.0 to about 7.0 wt %, and in some embodiments about 6 wt %. In some embodiments where surface crystallization is accomplished through post-formation introduction of lithium into the glass surface (as in an ion-exchange process), the original core glass composition can be free or substantially free of lithium during the melting, forming, and even cutting stages, with lithium introduced into the glass surface during only the later stages of crystallization.

The glass composition of embodiments may further comprise $Al_2O_3$. $Al_2O_3$ may serve as a glass network former, similar to $SiO_2$. $Al_2O_3$ may increase the viscosity of the glass composition due to its tetrahedral coordination in a glass melt formed from a properly designed glass composition. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process.

In some embodiments, an $Al_2O_3$ content of at least about 10 wt % (or about 6 mol %) can ease crystal formation. In some embodiments, the $Al_2O_3$ content does not exceed about 30 wt %, such as to achieve desired glass viscosities for melting and forming. In some embodiments, the $Al_2O_3$ content is from about 12 wt % (about 7 mol %) to about 25 wt % (about 17 mol %).

In some embodiments the glass core layer composition further comprises ZnO as a constituent. ZnO can be more effective in promoting surface crystallization of a beta-quartz solid solution compared to conventional nucleating agents, such as $TiO_2$ and $ZrO_2$. In some embodiments the glass core layer composition is free or substantially free of conventional nucleating agents, such as $TiO_2$ and $ZrO_2$. These conventional nucleating agents may be entirely excluded from embodiments to avoid imparting color to, or hardening of, the glass, or catalyzing nucleation in the bulk of the glass core layer (i.e., away from the exposed surface), which may decrease the compressive stress at the crystallized or semi-crystallized surface, may induce undesired light scattering, or may induce the formation of undesired crystalline defects during glass melting and forming.

In some embodiments the glass core layer comprises at least 1 wt % ZnO in the glass core layer to facilitate the crystallization process. In other embodiments, the glass core layer comprises from about 1% to about 10% ZnO, and in other embodiments from about 4% to about 8% ZnO.

The core glass composition may, in some embodiments, comprise other elements, such as alkali metal oxides such as $Na_2O$, $K_2O$, and the like, in amounts ranging from about 0.1 to about 15 wt % (or up to about 15 mol %). In some embodiments, the core glass may also comprise from about 0.1 to about 15 wt % (or up to about 15 mol %) of $B_2O_3$, and in some embodiments from about 0.1 to about 10 wt % (or up to about 15 mol %) of alkaline earth metal oxides, such as MgO, CaO, SrO, and BaO, and from about 0.1 to about 1 wt % of $SnO_2$ or $Fe_2O_3$.

In some embodiments that have a glass core layer comprising the components and the amounts described above, temperatures where nucleation and crystal growth occur may be within the crystallization temperature range of from about 500° C. to about 850° C. In some embodiments, the crystallization process temperature is carried out when the crystallization temperature is above the strain point temperature of the core glass composition. Subsequent cooling below about 500° C. stops nucleation, and crystal growth occurs when the nucleated glass is reheated to the range of from about 500° C. to about 850° C. In some embodiments, the glass is heated in a range of from about 550° C. to about 800° C., or in some of these embodiments from about 600° C. to about 700° C., to initiate nucleation and/or crystallization. In some embodiments, the heating of the glass article to cause crystallization and nucleation is conducted after the glass article is formed and cut to its final shape. In other embodiments, the heating to cause crystallization and nucleation is conducted provided the heat treatment will not unduly impact the properties of the laminated glass article.

In some embodiments, cooling of the glass below the nucleation temperature may be delayed momentarily within the nucleation temperature range to aid formation of crystal nuclei. For example, when a glass surface is cooled rapidly (quenched) below 600° C., the glass surface may contain no nuclei and, thus, may not crystallize in a desired manner. To aid in the formation of nuclei, the glass may be cooled slowly through the nucleation temperature range, held for a few seconds in the nucleation temperature range, or reheated to a temperature in the nucleation temperature range.

In other embodiments, where a surface is not nucleated (as when quenching is conducted), or only partially nucleated, a relatively uniform nucleation may be achieved by flash heating the surface, for example, by exposure to a temperature of about 800° C. to 900° C. This approach may be more effective with glasses having a high ZnO content, such as in embodiments where the ZnO content is up to about 10%, or up to about 8%, or from about 4% to about 10%, or from about 4% to about 8%.

In some embodiments, the crystallization stage is from about 20 minutes to about 180 minutes, at temperatures of from about 500° C. to about 800° C., such as at about 600° C. In some embodiments, the crystallization takes place at a temperature that is above the strain point of the core glass composition. Such heat treatments may be carried out in a tunnel kiln or conventional annealing lehr and may also incorporate an annealing step. In some embodiments, the heat treatment may be localized, as discussed below. In some embodiments, the laminated glass article may then be rapidly chilled, in the manner of thermal tempering, to save time and further improve strength. In some embodiments, measures may need to be taken to shield portions of the glass article that are not meant to be crystallized, such measures are discussed in more detail below.

An entire laminated glass article formation may be subjected to the same or similar heat treatment, and, in some embodiments, the exposed glass core layer as well as the glass cladding layers may undergo essentially uniform nucleation and crystal growth for example if they are constructed of the same materials. In some embodiments, the glass cladding layers are chosen to have a composition that is not readily crystallized, or at least not as readily crystallized as the core glass composition, for example so that the surfaces of the glass article do not undergo crystallization, and the free surfaces (exposed edges) of the core glass are the only regions that undergo substantial crystallization. In other embodiments, the thermal cycle is isolated to the exposed edge of the laminated article, or even isolated to the exposed glass core layer.

In some embodiments, the glass core layer is formed from a glass composition which comprises from about 5 wt % to about 7 wt % $Li_2O$; from about 55 wt % to about 67 wt % $SiO_2$; from about 22 wt % to about 28 wt % $Al_2O_3$; and from about 1 wt % to about 10 wt % ZnO. In these embodiments, the glass core layer may also include up to about 2 wt % $Na_2O$. The glass composition may be substantially free from other alkali metals and nucleating compounds, such as $TiO_2$ and $ZrO_2$.

In other embodiments, such as those that undergo a secondary lithium-enriching process like an ion exchange process, the glass core layer (prior to secondary lithium enrichment) is formed from a glass composition that comprises (during the melting, forming, and cutting steps) from about 55 wt % to about 67 wt % $SiO_2$; from about 12 wt % to about 28 wt % $Al_2O_3$; from about 10 wt % to about 15 wt % $Na_2O$; from about 0.1 wt % to about 5 wt % $K_2O$; from about 0 wt % to about 10 wt % $B_2O_3$; from about 0 wt % to about 5 wt % MgO; from about 0 wt % to about 2 wt % CaO; and from about 0 wt % to about 1 wt % $SnO_2$. In such embodiments, the specialized lithium enrichment (e.g., ion-exchange) and surface crystallization described further below can be carried out, the glass may be free or substantially free from $TiO_2$, $ZrO_2$, and ZnO. The glass may also be free or substantially free of $Li_2O$, prior to a lithium enrichment step that takes place after melting, forming, and glass cutting.

Figure 3:
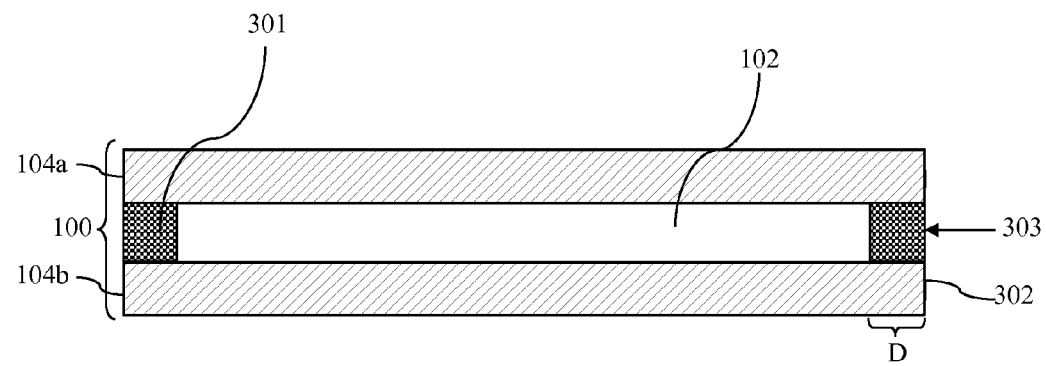
FIG. 3 schematically depicts a cross section of a laminated glass article according to one or more embodiments shown and described herein.

Referring to FIG. 3, in some embodiments, the depth D of the crystallized or semi-crystallized portion 301 of the glass core layer 102, as measured in a direction from the exposed edge 302 of the laminated glass article toward the center of the glass core layer may be less than about 50 μm, or even less than about 20 μm. In some embodiments, the depth D of the crystallized or semi-crystallized portion 301 may be less than about 15 μm, or even less than about 10 μm. However, it should be understood that any suitable crystallized or semi-crystallized portion depth may be used.

Figure 5:
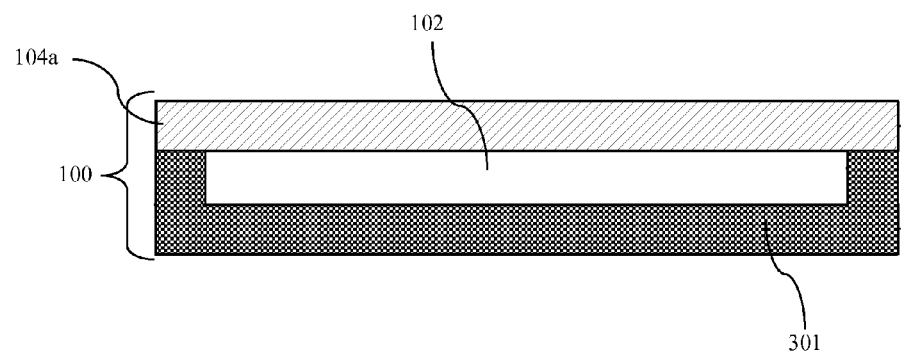
FIG. 5 schematically depicts a cross section of a laminated glass article with one clad layer according to one or more embodiments shown and described herein.

Referring to FIG. 5, in some embodiments, the laminated glass articles 100 have one clad layer 104a positioned on the core layer 102. The core layer 102 has a crystallized portion 301 on its exposed edges. In embodiments where there is one clad layer, the crystallized portion covers the entire exposed portion of the core layer. However, in other embodiments, the crystallized portion may cover less than the entire exposed portion of the core layer.

Figure 6:
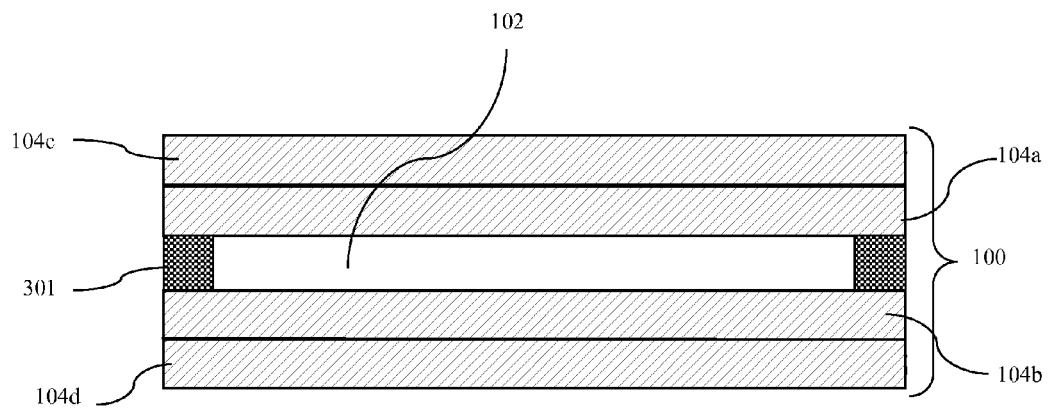
FIG. 6 schematically depicts a cross section of a laminated glass article with four clad layers according to one or more embodiments shown and described herein.

Referring to FIG. 6, in some embodiments, the laminated glass article 100 may comprise four clad layers 104a, 104b, 104c, and 104d. For example, clad layers 104a and 104b may be applied to the core layer 102 as disclosed herein. Thereafter, in some embodiments, additional clad layer, for example clad layers 104c and 104d, may be applied to the initial clad layers 104a and 104b to form a laminated glass article with four clad layers applied to the core. In some embodiments, the core layer 102 may comprise crystallized portions 301 at exposed portions thereof.

In one set of embodiments the compositions are suitable for forming a crystallized or semi-crystallized portion via heat treatment, and the composition of the glass core layer may also optionally be suitable for forming a laminated glass article by the fusion lamination process. In some embodiments the laminated glass article 100 described herein comprises a glass composition from which the glass core layer 102 is formed and has a liquidus viscosity and a liquidus temperature suitable for fusion formation. In some embodiments, the glass composition from which the glass core layer 102 is formed has a liquidus viscosity that is greater than or equal to about 35 kPoise. In some embodiments, the liquidus viscosity of the glass composition from which the glass core layer 102 is formed is greater than or equal to 100 kPoise, and in other embodiments greater than or equal to 200 kPoise. In some embodiments, the liquidus temperature of the glass composition from which the glass core layer is formed is less than or equal to about 1400° C. In some embodiments, the liquidus temperature is less than or equal to 1350° C., and in other embodiments is less than or equal to 1300° C. In still other embodiments, the liquidus temperature is less than or equal to 1200° C., and in other embodiments less than or equal to 1100° C., In some embodiments, the glass composition making up the glass core layer has liquidus viscosity and liquidus temperature suitable for fusion forming but may not be inherently amenable to surface crystallization. For example, in such embodiments, the glass core layer may be formed from a glass composition that comprises from about 55 wt % to about 67 wt % $SiO_2$; from about 12 wt % to about 28 wt % $Al_2O_3$; from about 10 wt % to about 15 wt % $Na_2O$; from about 0.1 wt % to about 5 wt % $K_2O$; from about 0 wt % to about 10 wt % $B_2O_3$; from about 0 wt % to about 5 wt % MgO; from about 0 wt % to about 2 wt % CaO; and from about 0 wt % to about 1 wt % $SnO_2$. In such embodiments, specialized lithium enrichment (e.g., ion-exchange) and surface crystallization methods described further below may be utilized, and the glass may be substantially free from $TiO_2$, $ZrO_2$, and ZnO. The glass may also be free or substantially free of $Li_2O$, prior to the lithium enrichment step, where the lithium enrichment step takes place after melting, forming, and glass cutting.

Thus, the glass core layer may be treated after formation and cutting of the laminated glass article to modify the composition of the glass core layer at the exposed surface on the edge of the laminated glass article. In some embodiments, for example, the amount of $Li^+$ at the exposed surface of the glass core layer may be insufficient for forming a crystallized or semi-crystallized portion; in such cases the surface of the exposed core layer may be treated to increase the amount of $Li^+$ on or near the surface of the exposed core layer, thereby rendering the exposed surface of the glass core layer amenable to subsequent crystallization.

In some embodiments the amount of Li$^+$ (or other ions) can be increased at the exposed surface of the glass core layer by conducting an ion exchange process on the glass article, such as where alkali metal ions, such as Na$^+$ and K$^+$, at or near the surface of the exposed glass core layer are replaced with smaller Li$^+$ ions. An example of an ion exchange method is provided in U.S. Pat. No. 4,726,981, which is herein incorporated by reference in its entirety.

In some embodiments, the ion exchange process can be accomplished by using one or more of a variety of Li$^+$ ion-containing salt baths, including low melting sulfate baths such as Li$_2$SO$_4$—Na$_2$SO$_4$ and Li$_2$SO$_4$—K$_2$SO$_4$ eutectics, nitrate baths, carbonate baths, chloride baths, or phosphate baths. Other viable ways to effect the ion exchange can be achieved through means other than immersion in a salt bath; for example, Li$^+$ ion-containing coatings may be applied either hot or cold, or a glass body can be exposed to Li$^+$ ion-containing vapors, or both coating(s) and exposure to vapor(s) with one or more heat treatments to develop an integral, ion exchanged, nucleated, crystallized or semi-crystallized surface portion containing beta-quartz solid solution (e.g., comprising low-expansion crystallites, such as eucryptite or spodumene crystallites). In some embodiments a Li$^+$ ion exchange coating is applied cold, and rapid heating of the body can be applied to avoid surface cracking resulting from the exchange reaction taking place below the strain point of the glass. In some embodiments, the ion exchange is conducted at temperatures high enough to avoid stress buildup, such as temperatures above the glass strain point, or near the glass annealing temperature, or in some embodiments between the glass strain point and the glass annealing temperature. Such temperatures may be above about 300° C., or even above about 500° C. In some embodiments, these temperatures are from about 550° C.-650° C.

In embodiments for which lithium ion-exchange was utilized, we have found that certain glass compositions that are generally considered to be non-crystallizable (e.g., those that are substantially free from TiO$_2$, ZrO$_2$, and ZnO), may nevertheless be readily crystallized at the surface using a certain ion-exchange process that was not previously recognized. In such embodiments, small amounts of certain bath dopants, such as carbonates, for example, potassium carbonate, sodium carbonate, magnesium carbonate, calcium carbonate, and lithium carbonate (K$_2$CO$_3$; Na$_2$CO$_3$; MgCO$_3$; CaCO$_3$; and Li$_2$CO$_3$) may be added to a eutectic or near-eutectic salt bath comprising Li$_2$SO$_4$—Na$_2$SO$_4$ or Li$_2$SO$_4$—K$_2$SO$_4$ or both. In some embodiments, the bath dopants are added in amounts ranging from about 0.1 to about 1 mol % (as a percent of the entire molten salt bath), and in some embodiments from about 0.2 to about 0.8 mol %. In other embodiments the bath dopants are added in amounts ranging from about 0.3 to about 0.7 mol %, and in some embodiments from about 0.4 to about 0.6 mol %. In some embodiments the molten salt baths with bath dopants may be allowed to equilibrate, for example, in some embodiments in a temperature range of 600° C. to 650° C., such as at about 625° C., for about 1 to about 12 hours before immersing the glass body or article for ion-exchange. Carbonate additives may promote surface nucleation and crystallization, however highly pure sulfate salts alone (with no dopants) may not lead to surface crystallization.

Without being bound to any particular theory, the effectiveness of carbonate dopants in the ion-exchange bath in promoting surface nucleation and crystallization in these glasses may be related to the strong tendency of carbonates to dissociate and result in basic (high pH) mixtures. Basic mixtures are known to enhance glass corrosion, and this corrosion or bond-breaking at the glass surface may enhance surface nucleation and crystallization. In contrast, more acidic additives, such as pure sulfates or silicic acid do not promote surface crystallization. Thus, various basic dopants may be added to molten salt baths (such as one or more of carbonates, bicarbonates, hydroxides, fluorides, and phosphates, and other high pH substances) to promote glass surface crystallization.

In some embodiments, an ion exchanged, crystallized or semi-crystallized surface portion having a thickness no greater than about 50 μm can be sufficient to impart high flexural and impact strengths. Other greater depths of exchange can be controllably and beneficially achieved by modifying the base glass composition, the composition of the Li$^+$ ion-containing material, or the time or temperature of the ion exchange process or some combination thereof. In some embodiments, the depth of the ion-exchanged portion is from about 1 μm to less than about 50 μm, and in some of these embodiments from about 5 μm to less than about 40 μm, and in some embodiments from about 10 μm to less than 20 μm, such as about 15 μm. Greater depths of the ion exchange portion may provide more protection from surface abuse of the laminated glass article. However, too great of a depth of the ion exchanged portion may alter the properties glass core layer (such as CTE) and, thus, may not be desirable. Further, having a shallow ion-exchanged portion may allow a fracture of the portion to be confined to the shallow ion-exchanged portion. In contrast, a thick surface compression portion may lead to increased tensile stress within the laminated glass article and result in a more violent fragmentation upon breakage.

In some embodiments, the ion exchange process is conducted at temperatures that promote crystallization of the surface of the glass core layer, thus the heat treatment that causes nucleation and crystallization, can be conducted simultaneously with, or immediately after, the ion exchange process. In other embodiments, the ion exchange process is conducted at a temperature that does not cause at least one of nucleation and crystallization and, thus, a subsequent heat treatment is required to nucleate or crystallize (or both) the exposed surface of the glass core layer.

While reference has been made herein to a specific glass composition used for forming the glass core layer 102, other glass compositions may be used to form the glass core layer 102 of the laminated glass article 100 wherein the glass compositions are amenable to surface crystallization and forming methods, such as fusion forming methods, float forming methods, and press forming methods.

Referring again to FIG. 1, the glass cladding layers 104a, 104b can be formed from a variety of different glass compositions wherein the composition of the glass cladding layers 104a, 104b is capable of being adhered to the glass core layer 102. In some embodiments, the glass cladding layers comprise alkali metals and/or compounds containing alkali metals. In some embodiments, the glass cladding layers are free of or substantially free from alkali metals and compounds containing alkali metals.

In some embodiments, the glass composition of the glass cladding layers 104a, 104b comprise SiO$_2$ in a concentration less than or equal to about 70 mol % (or about 66 wt %) for example in order to facilitate fusion forming the glass composition, if desired. In some embodiments, the concentration of SiO$_2$ in the glass composition is greater than or equal to about 58 mol % and less than or equal to about 66 mol. %. In some embodiments, SiO$_2$ is present in the glass composition in a concentration greater than or equal to about 60 mol % and less than or equal to about 64 mol %.

In some embodiments the concentration of $Al_2O_3$ in the glass composition is less than or equal to about 15 mol % (or less than about 25 wt %) such as to achieve a desired liquidus temperature to facilitate formation of the laminated glass article using fusion forming techniques. In some embodiments, the concentration of $Al_2O_3$ in the glass composition is greater than or equal to about 7 mol % and less than or equal to about 12 mol %. In some embodiments, the concentration of $Al_2O_3$ in the glass composition is greater than or equal to about 9 mol % and less than or equal to about 11 mol %.

$B_2O_3$ may be added to the glass composition, for example, to decrease the viscosity and liquidus temperature of the glass. For example, an increase in the concentration of $B_2O_3$ by 1 mol % may decrease the temperature required to obtain an equivalent viscosity by 10° C. to 14° C., depending on the specific composition of the glass. In some embodiments, $B_2O_3$ may lower the liquidus temperature of a glass composition by 18° C. to 22° C. per mol % of $B_2O_3$. As such, $B_2O_3$ can decrease the liquidus temperature of the glass composition more rapidly than it decreases the liquidus viscosity of the glass composition. $B_2O_3$ can also be added to the glass composition to soften the glass network. In some embodiments, $B_2O_3$ is present in the glass composition. For example, in some embodiments, $B_2O_3$ is present in the glass composition in a concentration greater than or equal to about 4 mol % (or greater than or equal to about 4 wt %). In some embodiments, $B_2O_3$ is present in the glass composition in a concentration greater than or equal to about 6 mol % and less than or equal to about 15 mol %. In some of these embodiments, the concentration of $B_2O_3$ in the glass composition is greater than or equal to about 7 mol % and less than or equal to about 12 mol %.

The glass composition or compositions used for the glass cladding layers may also comprise at least one alkaline earth oxide. The alkaline earth oxide can improve the melting behavior of the glass composition by lowering the temperature required for melting. Moreover, a combination of several different alkaline earth oxides can assist in lowering the liquidus temperature of the glass composition and in increasing the liquidus viscosity of the glass composition. The glass composition can comprise alkaline earth oxides, and can comprise CaO, MgO, SrO, BaO or combinations thereof.

The alkaline earth oxide (or combination of alkaline earth oxides) may be present in the glass composition in a concentration greater than or equal to about 6 mol % (or greater than about 4 wt %) and less than or equal to about 16 mol. % (or less than about 12 wt %). In some embodiments, the glass composition comprises from about 8 mol % to about 14 mol % alkaline earth oxide. The glass composition may optionally further comprise one or more fining agents. The fining agents can comprise, for example, $SnO_2$, $As_2O_3$, $Sb_2O_3$ or combinations thereof. Fining agents may be present in the glass composition in an amount greater than or equal to about 0 mol % and less than or equal to about 1 mol. %. In some embodiments, the fining agent is $SnO_2$. In some embodiments, $SnO_2$ is present in the glass composition in a concentration which is greater than about 0 mol % and less than or equal to about 0.5 mol %, and in some embodiments even less than or equal to about 0.2 mol %.

In some embodiments, the glass compositions used for forming the glass cladding layers 104a, 104b have a liquidus viscosity which renders them suitable for use in a fusion draw process and, in particular, for use as a glass cladding composition in a fusion lamination process. In some embodiments, the liquidus viscosity is greater than or equal to about 50 kPoise. In some embodiments, the liquidus viscosity is greater than or equal to 100 kPoise, and in some embodiments greater than or equal to 250 kPoise.

In some embodiments, the glass cladding layers 104a, 104b are formed from glass compositions which contain alkali ions, such as $Li^+$, $Na^+$, $K^+$ or combinations thereof. In such embodiments, the presence of alkali ions may facilitate chemically strengthening the glass by ion exchange, thereby improving the strength of the laminated glass article.

In some embodiments, the glass cladding layers 104a, 104b are formed from glass compositions that are free or substantially free of alkali ions, such as $Li^+$, $Na^+$, or $K^+$. In such embodiments, the surface of the glass may be placed in compression through a CTE mechanism, where the glass cladding layers have a lower CTE than the glass core layer. In addition, alkali-free glass cladding layers may not readily undergo surface crystallization in either a heating or ion-exchange process, such as the process used to crystallize the exposed edges of the glass core layer. In some embodiments, the glass cladding and glass core layers are subjected to a process which induces crystallization at exposed surfaces of the glass core layer without inducing crystallization at exposed surfaces of the glass cladding layer. In some embodiments, the crystallization process does not induce crystallization within the bulk of either the glass cladding or glass core layers, nor induce crystallization at the core-cladding interfaces that are not exposed.

Embodiments of a glass article having glass cladding layers free or substantially free of alkali ions can find application as an electronics substrate, such as a display glass or touch sensor substrate, where the electronic function of thin film layers deposited on the cladding glass surfaces is enhanced or retained or not hindered or degraded by a relatively alkali-free surface environment. In some embodiments a laminated glass article is provided with substantially alkali-free glass cladding layers, wherein the glass cladding layers are in compression by virtue of having a lower CTE than the CTE of the glass core layer, and wherein the glass core layer is crystallizable at or on or near the surface of its exposed edges using the compositions and methods disclosed herein. In some of these embodiments, the glass cladding layers are not amenable to surface crystallization, or less so compared to the glass core layer so as to avoid surface roughness or other modified properties that are generally induced by surface crystallization.

One or more specific glass compositions used for forming the glass cladding layers 104a, 104b, other glass compositions may be used to form the glass cladding layers 104a, 104b of the laminated glass article 100, for example glass compositions which are not readily amenable to crystallization. For example, Eagle XG® and Lotus™ glass, both manufactured by Corning Incorporated, may be used as the glass cladding layers.

A variety of processes may be used to form the laminated glass articles described herein including, without limitation, the fusion lamination process, slot-draw lamination processes, and float glass processes, where lamination may take place simultaneously with melting and forming, or lamination may be a separate process step after sheet formation.

Figure 2:
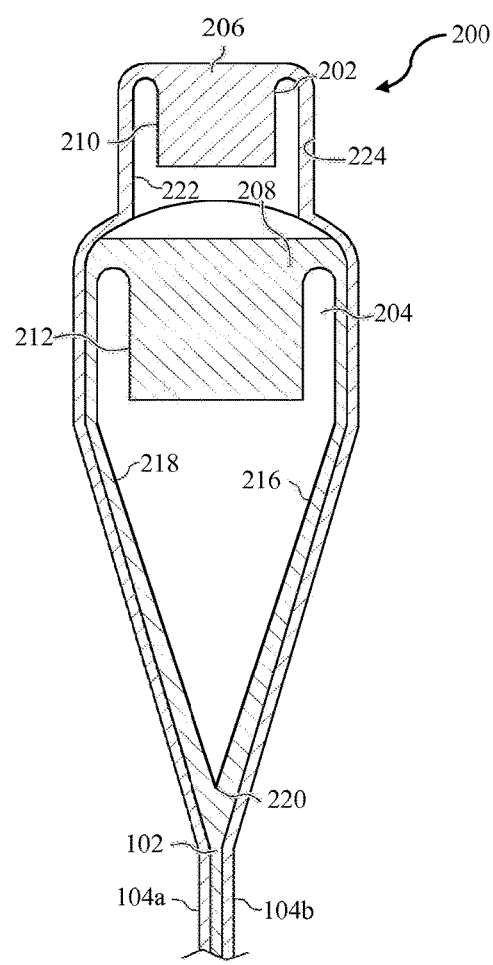
FIG. 2 schematically depicts a fusion draw process for making the glass article of FIG. 1.

In one set of embodiments, laminated glass articles 100 are formed by the fusion lamination process as described in U.S. Pat. No. 4,214,886, which is incorporated herein by reference in its entirety. Referring to FIG. 2 herein by way of example, a laminate fusion draw apparatus 200 for forming a laminated glass article includes an upper isopipe 202 that is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown).

As the molten glass core composition 208 fills the trough 212, the molten glass overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass article.

Simultaneously, the molten glass cladding composition 206 overflows the trough 210 formed in the upper isopipe 202 and flows over outer forming surfaces 222, 224 of the upper isopipe 202. The molten glass cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

In some embodiments, the molten glass core composition 208 has an average coefficient of thermal expansion $CTE_{core}$ which is greater than the average coefficient of thermal expansion $CTE_{clad}$ of the molten glass cladding composition 206. As the glass core layer 102 and the glass cladding layers 104a, 104b cool, the difference in the average coefficients of thermal expansion of the glass core layer 102 and the glass cladding layers 104a, 104b cause compressive stresses to develop in the glass cladding layers 104a, 104b. The compressive stress can increase the strength of the resulting laminated glass article even without an ion-exchange treatment or thermal tempering treatment.

Once the glass cladding layers 104a, 104b have been fused to the glass core layer 102 to form a laminated glass article 100, the laminated glass article can be further shaped into a desired three-dimensional form, such as by vacuum molding or other glass shaping process. The laminated glass article 100 may be cut into its final shape. For example, the laminated glass article 100 may be cut by a laser or a blade. The cutting of the laminated glass article may cause an edge of the glass article to be exposed such that the glass core layer 102 is exposed on the edge and possibly susceptible to damage.

Once the laminated glass article 100 is formed, shaped, or cut, or a combination thereof, the laminated glass article 100 may be heat treated to induce nucleation and crystallization of the exposed glass core layer on the edge of the laminated glass article, thereby producing a crystallized or semi-crystallized layer upon cooling with a lower CTE than the bulk of the glass core layer. Upon cooling, the lower CTE of the crystallized or semi-crystallized portion will induce or provide compressive stresses at or near the exposed edge of the laminated glass article to thereby strengthen the exposed edge of the laminated glass article. The heat treatment process can comprise heating the glass (particularly the exposed edge or otherwise the area for which crystallization is desired) to a temperature within a nucleation and crystallization temperature range, which may, in some embodiments, be from about 600° C. to about 850° C. In some embodiments, the laminated glass article is subjected to two heating steps at temperatures within the crystallization and nucleation temperature range. Where exposed surface of the glass core layer is not nucleated before the first heating step, a second heating step may be required to crystallize the exposed glass core layer. In such embodiments, the second heating step may be conducted at the same temperatures and for the same duration as the first heating step that caused the nucleation. However, in other embodiments, the second heating step may be conducted at other temperatures within the nucleation and crystallization temperature range and for a duration that differs from the first heating step. Between the first heating step and the second heating step, the exposed glass core layer may be cooled to a temperature outside of the nucleation and crystallization temperature range (e.g., cooled below about 600° C.).

Figure 4:
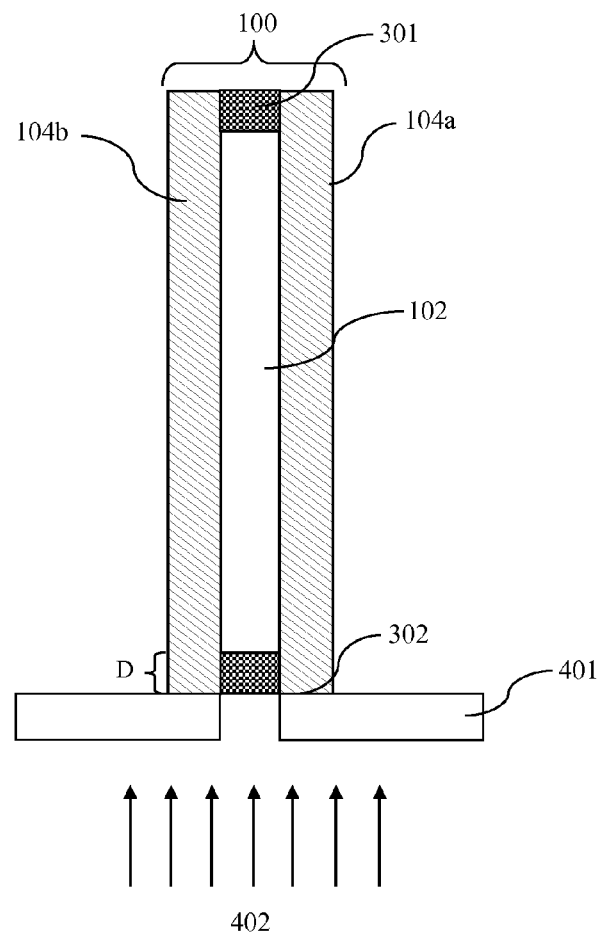
FIG. 4 schematically depicts a cross section of a laminated glass article according to one or more embodiments shown and described herein.

In some embodiments, an entire laminated glass article is subjected to heat treatment, such as, for example, by conducting the heat treatment in a kiln or annealing lehr. In other embodiments, only the exposed edge of the laminated glass article is subjected to the heat treatment. A localized heat treatment may lower the risk of damage to electronics that may have been deposited on the laminated glass article before the heat treatment. Referring again to FIG. 3, in some embodiments the localized heat treatment may be conducted by applying a laser or a flame 303 to only the exposed edge 302 of the laminated glass article 100, thereby only subjecting the exposed edge 302 to the heat treatment. Referring to FIG. 4, in other embodiments, the laminated glass article 100 may rest on cooled metal plates 401 that are suspended over heating elements 402. The cooled metal plates 401 may keep the portions of the glass article (e.g., cladding layers 104a and 104b) at a temperature below the nucleation and crystallization temperature. The exposed edge 302 of the laminated glass article 100 may be directly exposed to the heating element 402 through holes or slots in the cooled metal plates 401.

The laminated glass article 100 may be held at the crystallization temperature for a time period sufficient to impart the desired amount of crystallization to the glass core layer 102, or portion thereof, of the laminated glass article 100. In some embodiments, the longer the laminated glass article 100 is held at the heat treatment temperature, the greater the amount of crystallization occurs in the glass core layer 102 of the laminated glass article 100. In some embodiments, the laminated glass article 100 is held at the heat treatment temperature for a time period greater than or equal to about 10 seconds and less than or equal to about 10 hours. In some embodiments, the laminated glass article 100 is held at the heat treatment temperature for a time period greater than or equal to about 20 minutes and less than or equal to about 4 hours, and in some embodiments less than or equal to about 1 hour.

In some embodiments, the composition of the glass core layer 102 in the laminated glass article 100 is not amenable for crystallization upon heat treatment alone. In such embodiments, an ion exchange process can be conducted to introduce specific ions, such as, for example, $Li^+$, into the surface of the exposed glass core layer and, thus, provide a composition that is amenable to crystallization at the surface of the glass core layer. If ion exchange is used to promote nucleation at the edge of the laminated glass article, the ion exchange may be done to replace $Na^+$ with $Li^+$ to increase the propensity of forming a low CTE crystalline or semi-crystalline phase at the exposed glass core layer. In the initial stages of the ion exchange, the replacement of $Na^+$ ions with smaller $Li^+$ ions may create tensile stresses in the laminated glass article. Accordingly, to avoid cracking of the glass article, the ion exchange of $Li^+$ ion for $Na^+$ ions may be done at a temperature that is high enough to avoid this stress buildup, such as at a temperature above the strain point of the original glass body. In some embodiments, conducting the ion exchange at these elevated temperatures does not interfere with the strength of the crystallized or semi-crystallized portion for example because the difference in CTE between the crystalline or semi-crystalline portion (low CTE) and the bulk glass article (high CTE) provides compressive stress to the crystalline or semi-crystalline portion and, thereby, provides strength to the crystalline or semi-crystalline portion that is formed on the exposed glass core layer.

A salt bath comprising, for example, $Li^+$ ions including low-melting sulfate baths such as $Li_2SO_4$—$Na_2SO_4$ and $Li_2SO_4$—$K_2SO_4$ eutectics, can be used for the ion exchange process. In some embodiments, the entire laminated glass article may be dipped in the salt bath and maintained in the salt bath for a duration suitable to perform an exchange of $Li^+$ ions from the salt bath for other alkali metal ions, such as $Na^+$ or $K^+$, in the glass core layer. The temperature at which the ion exchange process is conducted may be from about 600° C. to about 700° C., such as about 650° C. The duration of the ion exchange process may be from about 5 minutes to about 10 hours, or in some embodiments from about 1 hour to about 5 hours. To protect electronics deposited on the laminated glass article in some embodiments, the electronics may be covered by a removable silicon nitride layer. In other embodiments, electronics may be protected by localizing the ion exchange reactant (e.g., the salt solution) to the exposed edge of the laminated glass article. For example, in some embodiments the ion exchange reactant may be applied as a paste or a liquid to the exposed edge of the laminated glass surface. In other embodiments, the exposed edge of the laminated glass article may be exposed to ion exchange reactant in a vapor form. In other embodiments, the ion-exchange process may be carried out before any electronics layers are deposited, and the glass article is well cleaned after ion-exchange, before any electronics layers are formed.

In some embodiments, 0.01 to 5 mol % of basic dopants (for example, selected from carbonates, bicarbonates, hydroxides, fluorides, phosphates or combinations thereof) are added to an ion-exchange salt bath, and these dopants can promote surface crystallization in the glass surface that may not otherwise occur without addition of the dopants to the salt bath. In some embodiments a glass article is formed comprising a core glass that is free or substantially free from $TiO_2$, $ZrO_2$, and ZnO wherein a low-CTE crystalline or semi-crystalline surface portion is formed on the glass that is integral with the glass article, the core glass comprising a continuous transition region or a non-planar interface between the crystalline or semi-crystalline surface portion and the bulk of the glass article. Such a glass article can be incorporated into a laminate structure, but also in a general non-laminated structure.

The ion exchange process may be conducted at a temperature and for a duration that allows the ion-exchanged surface to crystallize during the ion exchange process. In some embodiments, a subsequent heat treatment, as described above, may need to be conducted to crystallize the ion-exchanged surface of the glass article after the ion exchange process has been completed.

The glass articles described herein can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; for lighting or signage (e.g., static or dynamic signage) applications; or for transportation applications including, for example, rail and aerospace applications.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of manufacturing a laminated glass article comprising at least one glass cladding layer and a glass core layer adhered to the at least one glass cladding layer, the method comprising:
   removing a portion of the laminated glass article such that an exposed surface of the glass core layer is exposed on at least one edge of the laminated glass article;
   conducting an ion exchange at the exposed surface of the glass core layer to introduce $Li^+$ or $Na^+$ ions to the exposed surface of the glass core layer, the ion exchange comprising contacting the exposed surface of the glass core layer with a molten salt bath comprising one or more additives selected from the group consisting of carbonates, bicarbonates, hydroxides, fluorides, and phosphates; and
   crystallizing a portion of the glass core layer at the exposed surface to form a crystallized or semi-crystallized surface of the glass core layer, the portion of the glass core layer having a lower coefficient of thermal expansion (CTE) than a remainder of the glass core layer, wherein the crystallizing step comprises heat treating at least the exposed surface of the glass core layer, the heat treating comprising:
      heating at least the exposed surface of the glass core layer to a nucleation temperature in a range of from about 500° C. to about 850° C.;
      cooling at least the exposed surface of the glass core layer to a temperature below about 500° C.; and
      reheating at least the exposed surface of the glass core layer to a crystallization temperature in a range of from about 500° C. to about 850° C., where the crystallization temperature is at least about 5 degrees higher than the nucleation temperature.

2. The method of claim 1, further comprising maintaining the remainder of the laminated glass article at a temperature below the nucleation temperature and the crystallization temperature during the heat treating.

3. The method of claim 1, wherein the heat treating comprises applying a flame or a laser to the exposed surface of the glass core layer.

4. The method of claim 1, further comprising shielding the at least one glass cladding layer during the heat treating to maintain the at least one glass cladding layer below the nucleation temperature and the crystallization temperature during the heat treating.

5. A method of forming a surface-crystallized or semi-crystallized glass article, the method comprising:

contacting a glass body with a salt composition, the glass body free or substantially free of $TiO_2$, $ZrO_2$, and ZnO, the salt composition comprising major and minor components, the major components comprising $Li_2SO_4$—$K_2SO_4$, $Li_2SO_4$—$Na_2SO_4$, or both, and the minor components comprising 0.01 to 5 mol % of one or more basic additives, the one or more basic additives selected from the group consisting of potassium carbonate, sodium carbonate, magnesium carbonate, calcium carbonate, and lithium carbonate; and nucleating and growing crystals at or near a surface portion of the glass body, the crystals substantially formed from and integral with a bulk of the glass body; wherein the surface portion has a lower average coefficient of thermal expansion (CTE) than the bulk of the glass body.

6. A method of manufacturing a laminated glass article comprising at least one glass cladding layer and a glass core layer adhered to the at least one glass cladding layer, the method comprising:

removing a portion of the laminated glass article such that an exposed surface of the glass core layer is exposed on at least one edge of the laminated glass article; and heat treating at least a portion of the exposed surface of the glass core layer to form a crystallized or semi-crystallized surface of the glass core layer, the portion of the glass core layer having a lower coefficient of thermal expansion (CTE) than a remainder of the glass core layer, wherein the heat treating comprises:

heating at least the exposed surface of the glass core layer to a nucleation temperature in a range of from about 500° C. to about 850° C.;

cooling at least the exposed surface of the glass core layer to a temperature below about 500° C.; and reheating at least the exposed surface of the glass core layer to a crystallization temperature in a range of from about 500° C. to about 850° C., where the crystallization temperature is at least about 5 degrees higher than the nucleation temperature.

7. The method of claim 6, wherein the heating and the reheating comprise applying a flame or a laser to the exposed surface of the glass core layer.

8. The method of claim 7 further comprising:

conducting an ion exchange at the exposed surface of the glass core layer to introduce $Li^+$ or $Na^+$ ions to the exposed surface of the glass core layer before the crystallizing step.

9. The method of claim 8, wherein:

the conducting the ion exchange comprises applying a solution comprising Li-containing constituents to the exposed surface of the glass core layer; and the solution comprises a gel or a liquid applied only to the exposed surface of the glass core layer.

10. The method of claim 8, wherein the conducting the ion exchange comprises contacting the exposed surface of the glass core layer to a molten salt bath comprising potassium carbonate, sodium carbonate, magnesium carbonate, calcium carbonate, and lithium carbonate.

11. The method of claim 7, further comprising shielding the at least one glass cladding layer during the heat treating to maintain the at least one glass cladding layer below the nucleation temperature and the crystallization temperature during the heat treating.

12. A method of manufacturing a laminated glass article comprising at least one glass cladding layer and a glass core layer adhered to the at least one glass cladding layer, the method comprising:

removing a portion of the laminated glass article such that an exposed surface of the glass core layer is exposed on at least one edge of the laminated glass article;

heat treating at least a portion of the glass core layer at the exposed surface to form a crystallized or semi-crystallized surface of the glass core layer, the portion of the glass core layer having a lower coefficient of thermal expansion (CTE) than a remainder of the glass core layer, wherein the heat treating comprises heating at least the exposed surface of the glass core layer to a nucleation temperature and a crystallization temperature; and shielding the at least one glass cladding layer during the heat treating to maintain the at least one glass cladding layer below the nucleation temperature and the crystallization temperature during the heat treating.

13. The method of claim 12, wherein the heating and the reheating comprise applying a flame or a laser to the exposed surface of the glass core layer.

14. The method of claim 12 further comprising:

conducting an ion exchange at the exposed surface of the glass core layer to introduce $Li^+$ or $Na^+$ ions to the exposed surface of the glass core layer before the crystallizing step.

15. The method of claim 14, wherein:

the conducting the ion exchange comprises applying a solution comprising Li-containing constituents to the exposed surface of the glass core layer; and the solution comprises a gel or a liquid applied only to the exposed surface of the glass core layer.

16. The method of claim 14, wherein the conducting the ion exchange comprises contacting the exposed surface of the glass core layer to a molten salt bath comprising potassium carbonate, sodium carbonate, magnesium carbonate, calcium carbonate, and lithium carbonate.

* * * * *